United States Patent [19]

Abatti et al.

[11] Patent Number: 4,590,739

[45] Date of Patent: May 27, 1986

[54] FIELD CROP HARVESTING SYSTEM

[76] Inventors: C. Alex Abatti; Robert Urmston, both of 1296 W. Evan Hewes Hwy., El Centro, Calif. 92243

[21] Appl. No.: 552,716

[22] Filed: Nov. 17, 1983

Related U.S. Application Data

[63] Continuation-in-part of Ser. No. 431,905, Sep. 30, 1982, which is a continuation-in-part of Ser. No. 159,941, Jan. 16, 1980, Pat. No. 4,292,784.

[51] Int. Cl.⁴ ............................................. A01D 90/00
[52] U.S. Cl. ....................................... 53/391; 414/343
[58] Field of Search ................... 53/391; 414/343, 345, 414/340

[56] References Cited

U.S. PATENT DOCUMENTS

| | | | |
|---|---|---|---|
| 2,647,525 | 8/1953 | Duda et al. | 53/391 X |
| 2,699,877 | 1/1955 | Huston | 53/391 X |
| 3,633,336 | 1/1972 | Rempel | 53/391 |

FOREIGN PATENT DOCUMENTS

| | | | |
|---|---|---|---|
| 1262158 | 2/1968 | Fed. Rep. of Germany | 414/343 |
| 166701 | 7/1921 | United Kingdom | 414/343 |
| 347379 | 4/1931 | United Kingdom | 414/343 |

*Primary Examiner*—James F. Coan
*Attorney, Agent, or Firm*—Ralph S. Branscomb

[57] ABSTRACT

A harvesting apparatus is provided wherein a forward harvesting machine tows a rearward shuttle truck, both vehicles being self-propelled, with the harvesting machine having a crop collection system comprising a series of conveyors which convey the crops from a pair of forward wing conveyors through a cleaning/fungiciding station to a pair of on-board longitudinally extended conveyors spaced on opposite sides of the harvesting machine. Between these two spaced longitudinal crop conveyors extending centrally down the bed of the harvesting machine is a full box conveyor for boxes which have been packed, and between the full box conveyor and the crop conveyors are the respective work areas having sorting bins and packing stands enabling workers in these areas to remove individual crops such as melons from the outer crop conveyors and place them in the boxes, and then place the boxes on the central full box conveyor, which is moving rearwardly.

The full boxes on the full box conveyor move rearwardly to a bridge and over the bridge onto a roller conveyor longitudinally extended on the shuttle truck. Once this is done, the shuttle truck releases from the harvest truck and takes the cleaned, fungicided, sorted, boxed and palletized crop to a freight depot or cooling station where it can be cooled or shipped without further handling other than by the pallet.

12 Claims, 8 Drawing Figures

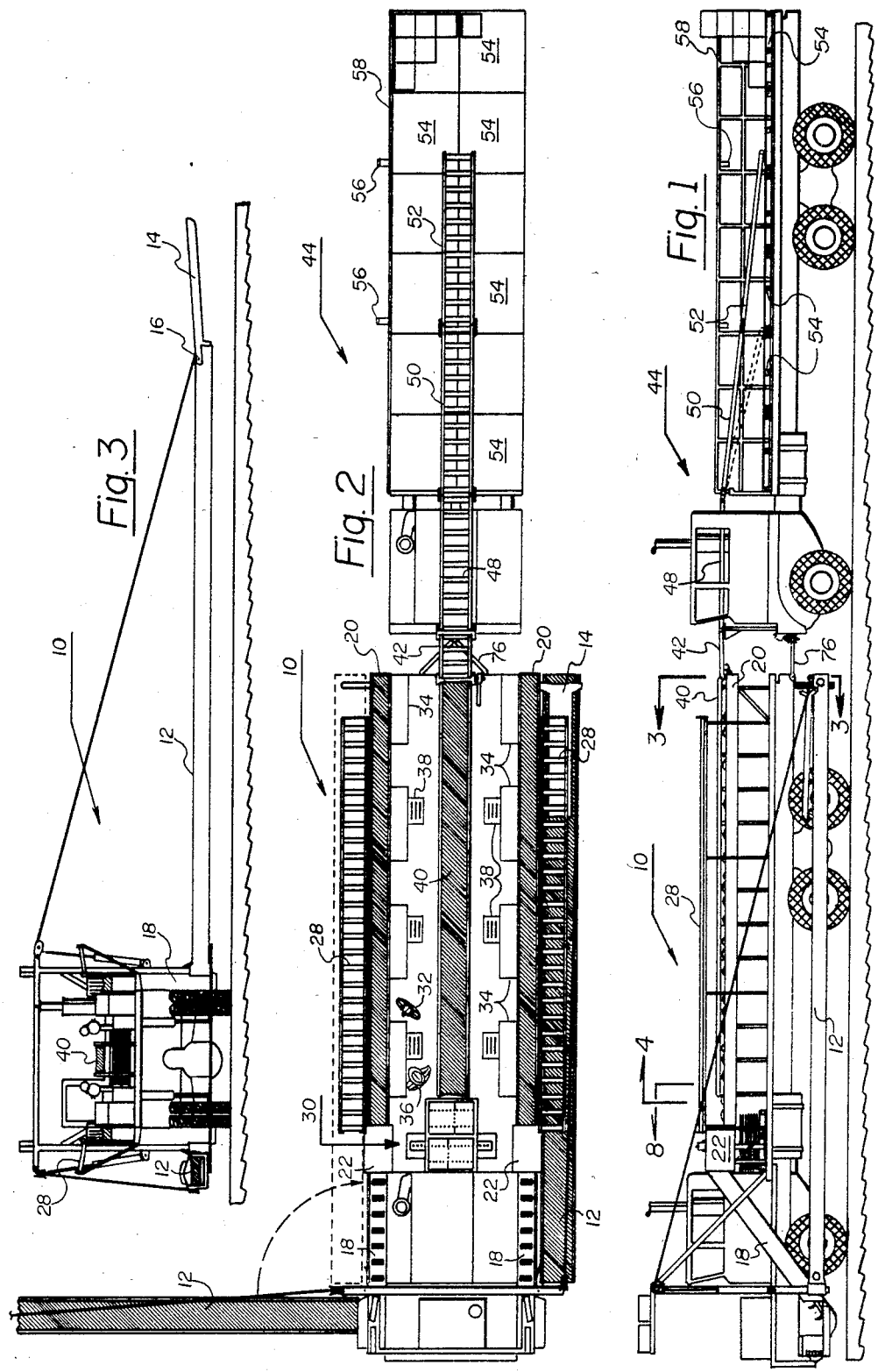

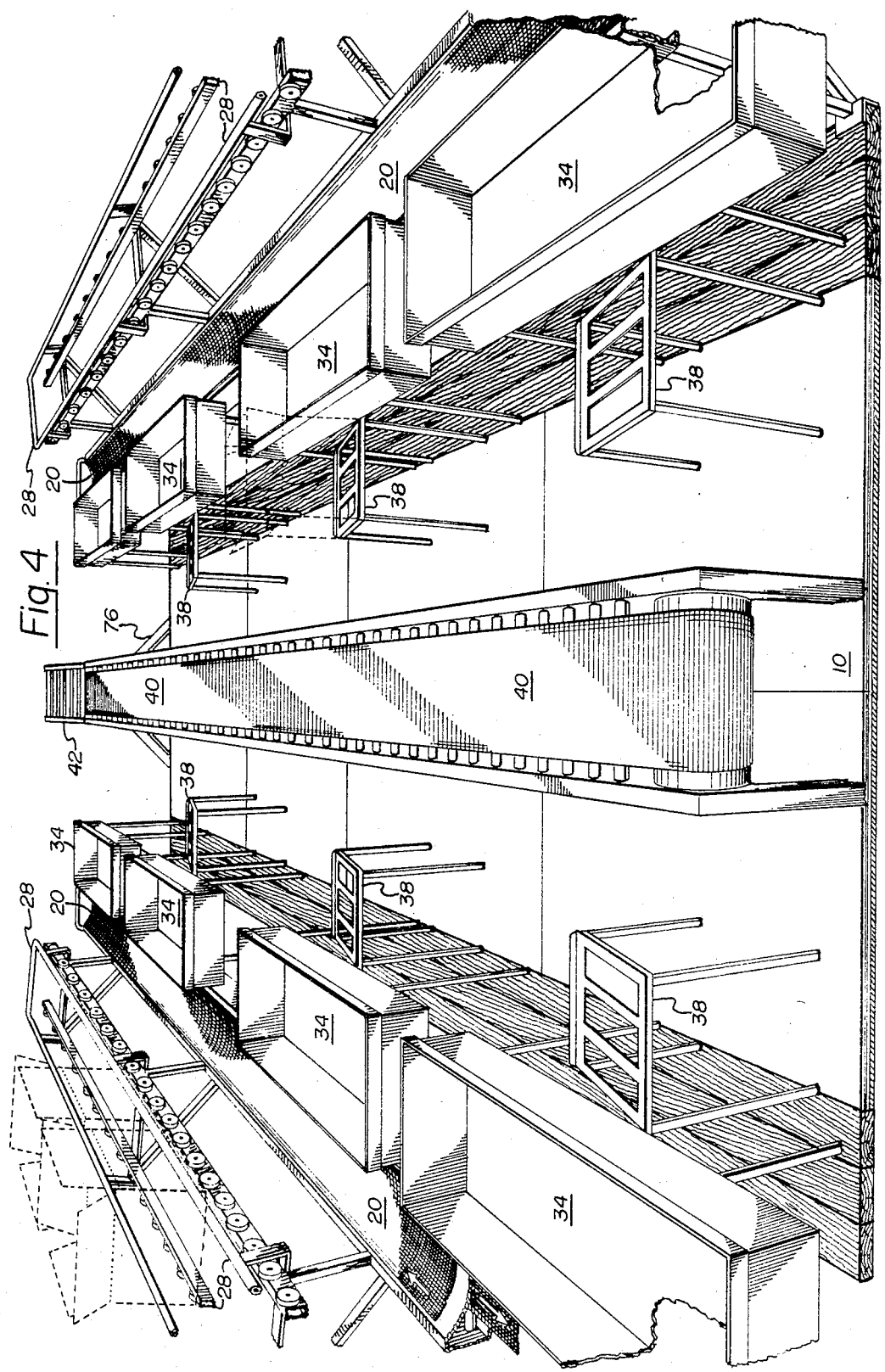

FIELD CROP HARVESTING SYSTEM

BACKGROUND OF THE INVENTION

This invention is a continuation-in-part of patent application Ser. No. 06/431,905, filed 9/30/82, which was in turn a continuation-in-part of U.S. Pat. No. 4,292,784, issued 10/6/81.

These three patents represent three stages of the continuous development and improvement of a field crop harvesting machine and a system designed to reduce requirements for field labor while at the same time virtually eliminating the requirement for secondary or tertiary handling of the crop once it has been harvested.

Only a few years ago, crops such as zucchini, watermelon, and smaller melons were picked primarily by hand by workers walking through the fields and loading loose boxes which were then hiked up onto a flatbed truck, or in the case of larger crops such as watermelons, the melons would be thrown up to workers in the truckbed, where they would be loaded loosely in the truck.

The truck would then be driven to a sorting, packing, cooling, and shipping station where it would be unloaded by hand from the truck, sorted by hand (often by throwing the fruit from one worker to another), cleaned and sprayed with fungicide if necessary, and then boxed and palletized for shipment, subsequent to which the produce would be cooled in a refrigerated chamber.

In addition to the obvious fact that this required a lot of handling and added a considerable labor cost to the other costs of field crop production, the repeated handling also added to the percentage of the fruit that was either deteriorated in quality or unusable due to bruising, cracking, and outright breakage. Watermelon crops, for example, had an approximately ten percent attrition rate during harvesting and packing from these causes.

These problems and the costs involved in field crop harvesting the old-fashioned way have spawned the development of increasingly sophisticated machines to assist in the harvesting process. This development, especially in the improvements in harvesting techniques for watermelons, smaller melons, zucchini and certain other crops can be traced from the issued patent and the pending application that are the parents of this application. Although when the initial application was filed, automation to some degree had penetrated the fields of harvesting lettuce, pineapples, and certain other crops, there was no general system available which could harvest, clean, sort, box, palletize, group the pallets and haul them off to the cooling shed while the harvester was still harvesting the general field crops.

The first issued patent referenced above more or les accomplished this with a harvesting machine having a pair of long, laterally extended, inwardly moving wing conveyors on which workers, working behind the conveyors, placed the crops. The crops were passed through a series of conveyors along the opposite sides of the harvesting machine rearwardly. Sorters moved the crops, for example, watermelons, from the conveyors, and put them in large boxes which were palletized on the harvesting machine. Once the pallets were filled, a shuttle truck having a roller bed backed up to the rear of the harvesting machine, and with a long cable, drew the entire truckload of palletized, boxed watermelons onto the shuttle with a winch, which were then driven to the cooling sheds.

The next continuation-in-part application to the original application added certain modifications which would generally improve the performance of the harvesting machine, and also add the capability of harvesting smaller crops. A wing conveyor accessory enabled zucchini and other small crops to be harvested on the larger conveyors used for watermelons, and the center portion of the harvester was modified to accommodate the smaller boxes used for these smaller crops.

Additional general improvements included a load levelling system to enable operators to line up the roller bed in the harvester with the roller bed in the shuttle truck. A special drive system was also developed to permit machine movement through the field at infinitely low speeds.

SUMMARY

The previously developed machines were ideal for watermelons. Because of the large size of the containers in which the watermelons are packed for palletization, the most practical way to transfer the melons from the harvesting, sorting and packing machine to the shuttle truck was by backing the shuttle truck up to the rear of the harvester, and pulling off the palletized, boxed melons onto the shuttle.

The transfer operation, utilizing the backed up shuttle truck, takes about ten minutes. The time required to fill the melon boxes on the harvesting machine between transfers to the shuttle is thirty to forty minutes. Because the harvester cannot harvest while the transfer is being made with the prior system, there is a built-in inefficiency of 25% to 33%. Although this is still a more efficient method than the prior art, obviously it would be desirable to reduce the transfer time even further.

The instant invention is designed not for watermelons but for muskmelons, honeydews, zucchini, and other crops which are smaller than watermelons and which are packaged in smaller boxes. Because of the smaller boxes, it is practical to transfer them over a conveyor spanning to the shuttle truck which is following the harvester through the fields. On the shuttle truck, the boxes are palletized as they come across on the conveyor. According to the instant invention then, when a full truckload of crop has been harvested, rather than the crop being on the harvester and requiring transfer to the shuttle, under the new system the crop is already loaded on the shuttle truck and all that is required further is to unhitch the shuttle and replace it with the second shuttle.

Although it might required two or three minutes for the loaded shuttle truck to pull out of the fields and be replaced with an empty one, under the new system this replacement does not require stopping the harvesting machine, except for just a few seconds while the conveyor bridge is raised and the tow-bar released. Once the loaded shuttle has been released, the harvester continues to move through the fields, there being ample room on the harvester to temporarily store boxes as they are filled until the new shuttle truck arrives.

Thus the efficiency of the system, assuming there are enough shuttle trucks that no unnecessary delay is caused, is virtually 100 percent. Even the thirty seconds required to release the loaded shuttle may not be idle, as the pickers may get a little behind just before the shuttle stops and the thirty or forty seconds would allow them to catch up before the machine moves on again.

BRIEF DESCRIPTION OF THE DRAWINGS

FIG. 1 is an overall side elevation view illustrating the harvester connected to and towing a shuttle truck as they would appear in the harvesting operation except that the wing conveyors of the harvester would be extended outwardly as shown in FIG. 3;

FIG. 2 is a top elevation view of the harvester and shuttle as shown in FIG. 1;

FIG. 3 is a diagrammatic rear elevation view of the harvester as seen from Line 3—3 on FIG. 1;

FIG. 4 is an isometric view of the rear portion of the sorting and packing area of the harvester truck as seen from Line 4 of FIG. 1;

DETAILED DESCRIPTION OF THE PREFERRED EMBODIMENT

Figure 6:
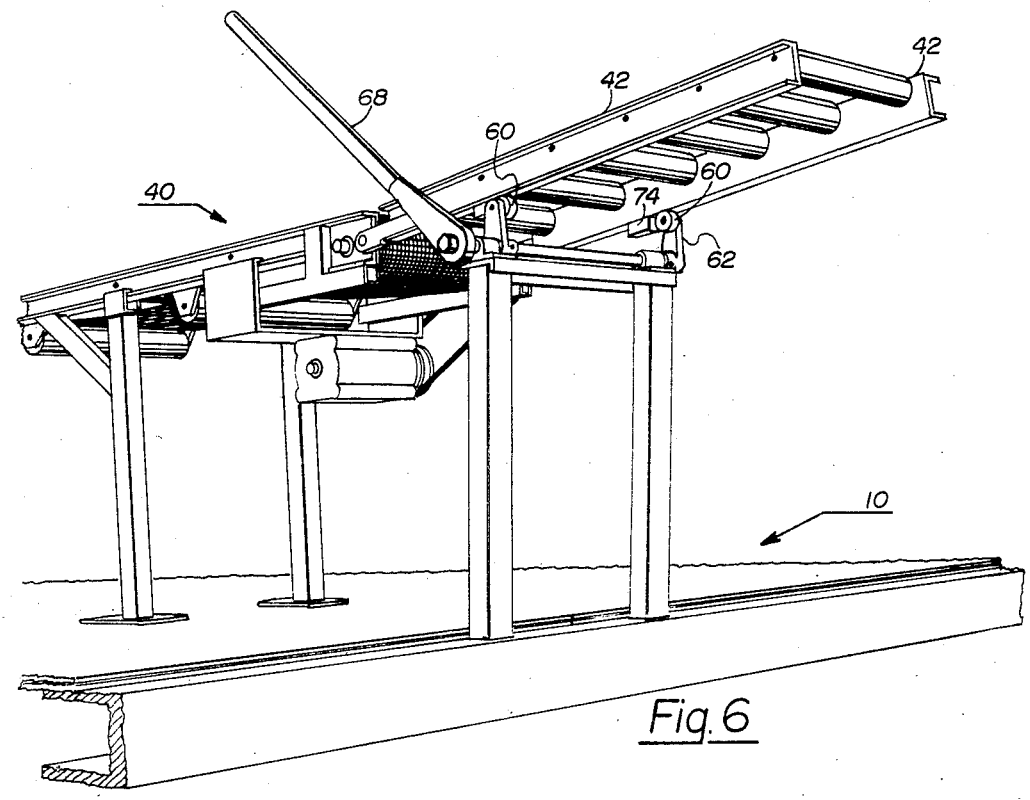
FIG. 6 is an isometric view of the rear of the harvester truck showing the conveyor bridge in some detail.

The harvesting machine 10 utilizes the same basic crop collection system as the the predecessor machines described in the above-referenced patent and pending application. Extending from both sides of the machine are wing conveyors 12 which are moving inwardly. The workers walk behind the wing conveyors and place the crops, which may have already been cut from their vines or plants, onto the conveyor. In the instant embodiment, extension troughs 14 are attached to the end of the wing conveyors so that more rows of crops can be covered at a time. The trucks are primarily for melons, and are angled upwardly so that the melons roll down onto the hydraulically driven wing conveyors 12. The extensions are hinged at 16 and when the harvesting machine is not in use, they are folded over onto the wings as shown in FIG. 1.

The crops move inwardly on the wing conveyors 12, and are then transferred to elevator conveyors 18, and subsequently to the longitudinal hydraulically driven conveyors 20 which extend alongside the edges of the harvesting machine.

In the instant invention, to this basic system a capability has been added for cleaning and spraying the produce, and for stapling boxes on board. Cleaners/sprayers 22 comprise commercially available equipment that has been modified for on board mounting. These units have rows of rotating brushes which first remove loose dirt and dust from the melons which are then subsequently sprayed with a fine mist containing a fungicide dissolved in a cosmetic wax. Because the harvesting system of the instant invention produces boxed crops ready for market, the cleaning and the application of the cosmetic wax and fungicide must be accomplished onboard, or the melons or other crops will not receive a premium price in the market place. Clean, waxed produce brings a substantially greater price than dusty, untreated produce.

Figure 8:
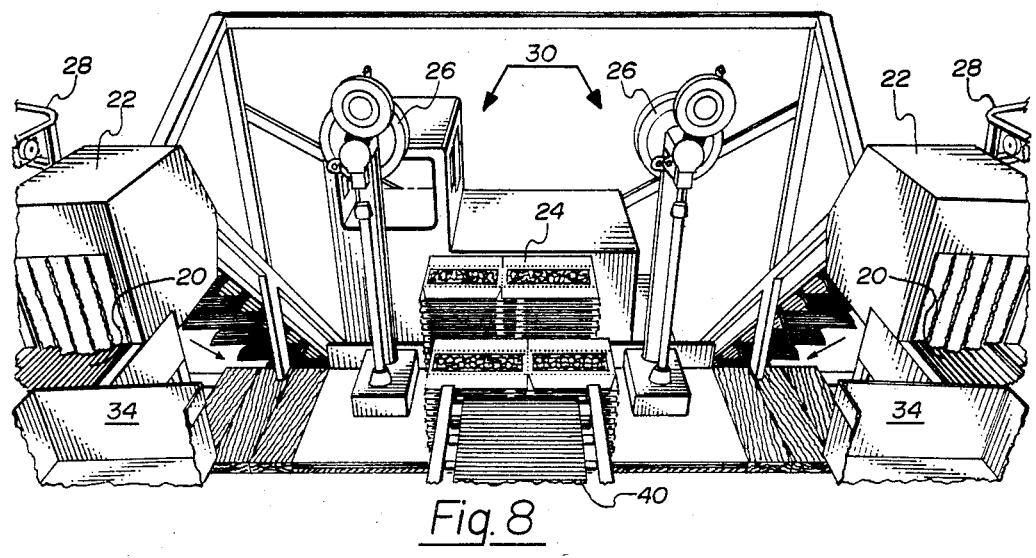

In FIG. 8, which illustrates the cleaning/spraying stations, there can also be seen the flat boxes 24 and the two stapling machines 26 which permit one or more workers in this forward area of the harvesting machine to staple the bottoms of the boxes together, subsequent to which he places them on the empty box roller conveyors 28. The box maker pushes the boxes rearwardly, with one box pushing the next, so that the boxes are readily available along the length of the machine.

The general operation of the harvesting system will be described with some of the details covered later. FIG. 2 provides the best illustration for understanding the overall operation of the system. Although this machine can be used for a variety of crops, for simplicity the crop will be referred to as melons to facilitate the understanding of the process. Minor changes in the Orocedure might be necessary for other crops.

The inboard areas of the harvesting machine and the shuttle vehicle are termed the "packing area" and the "crop preparation area", respectively, in the claims. These terms are intended to be broad enough to cover the possibility of transferring one or more of the preparation takes from one vehicle to the other, deviating slightly from the disclosed embodiment.

As the melons proceed along the hydraulically driven conveyors 20, they are picked up by the sorter, indicated at 32. The sorter arranges the melons in their various grades in the sorting bins 34. There would generally be a sorter between each pair of bins.

The packer stands inboard of the sorting bins alongside the packing stand 38. He draws down boxes as needed from the empty box conveyors 28 and puts them on the packing stand. He packs one grade of melons, marks the grade on the box, closes the box, and then puts the full box on the full box conveyor 40. This conveyor is powered, and delivers boxes to the passive roller bridge 42. In the instant embodiment, this bridge is angled upwardly so that boxes are forced up the bridge by boxes driven by the conveyor 40.

Figure 5:
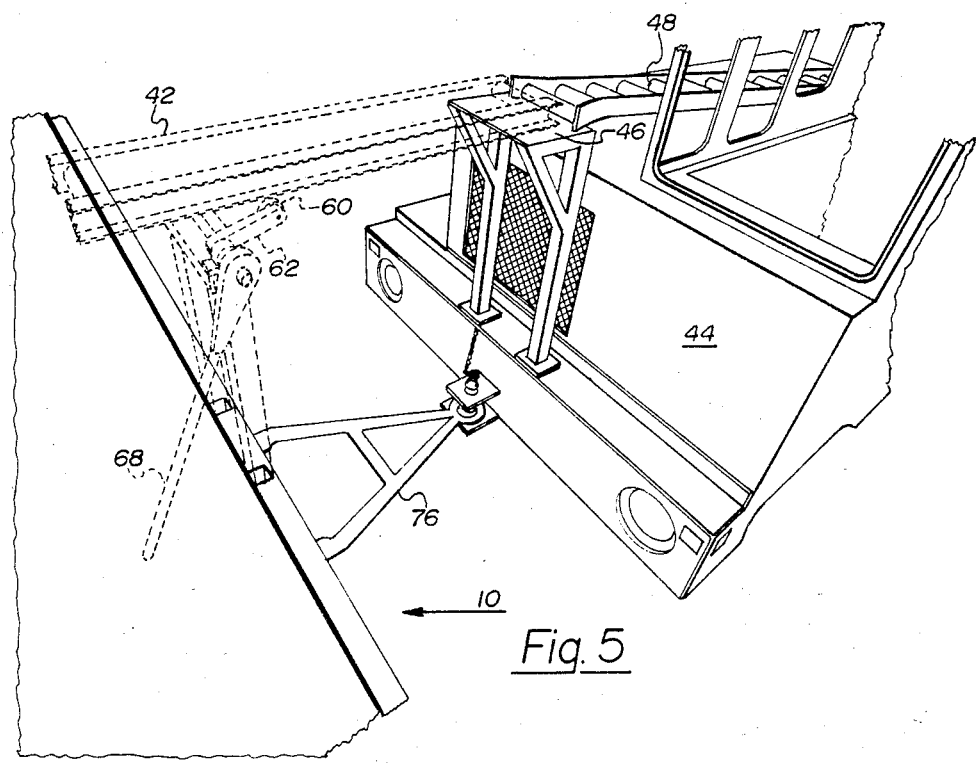
FIG. 5 is a somewhat diagrammatic isometric illustration of the coupling between the harvester and the shuttle truck.

The conveyor system which moves boxed crops rearwardly basically comprises a forward portion, described above, and a rear portion which is mounted to the shuttle truck 44. The roller bridge 42 rests on a shelf 46 at the front of the shuttle as best seen in FIG. 5. The rear conveyor portion comprises a fixed roller conveyor 48 which connects to two removable segments 50 of rearward portion of the roller conveyors. These conveyors would likely be the skate-wheel type conveyor, but for simplicity of illustration are shown as the cylindrical roller conveyors.

As the full boxes of melons pass over the cab of the shuttle truck and down the front and rear conveyors 50 and 52 respectively, they are loaded onto pallets 54 already arranged on the bed of the shuttle truck. As shown in FIG. 1, the rear pallet is loaded first utilizing the full length of the conveyors 50. As the rearmost pallet is filled, to be able to load the more forward pallets, first the conveyor 52 is removed from the conveyor 50 so that the latter folds down to the position indicated in dotted line in FIG. 1. The conveyor 52 is hung onto hooks 56, shown in FIG. 2, on the rail 58. The rail is on the right side of the shuttle only, so that a forklift can remove the pallets from the left side at the cooling shed.

As the shuttle truck fills up, finally the removable conveyor 50 is hung on the hooks 56 so that the foremost pallets are loaded directly from the fixed conveyor 48 alongside the cab of the shuttle.

Figure 7:
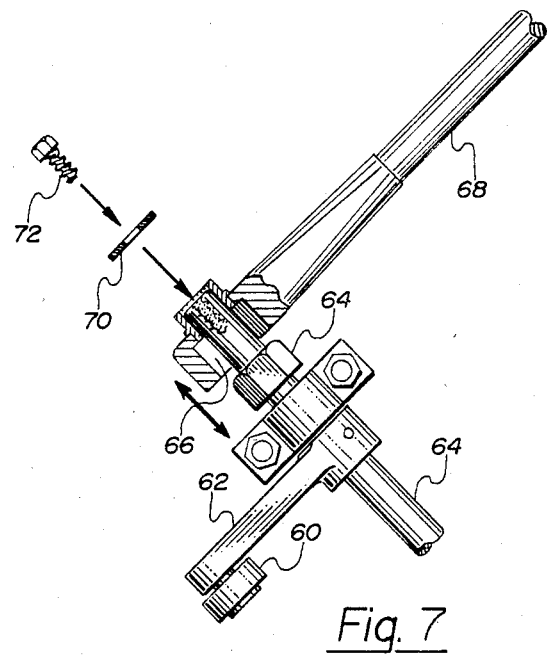
FIG. 7 illustrates the cam arm and handle used to raise the conveyor bridge; and, FIG. 8 is a perspective view of the front portion of the packing and processing area of the harvester truck as seen from Line 8 of FIG. 1.

The above describes the complete harvesting, cleaning, spraying, sorting, boxing, and finally palletization of the melons. All that remains is the disconnection of the shuttle from the harvester, and its replacement with an empty shuttle. With reference to FIGS. 5 and 6, first the roller bridge is raised clear of the support shelf 46. This is accomplished by a pair of cam rollers 60 mounted on arm 62 fixed on a shaft 64 as best seen in FIG. 7. At one end of this shaft is a fixed hexagonal bolt 64 which is engaged by hexagonal socket 66 of the long handle 68. The shaft and handle are retained together by cap washer 70 and a bolt 72. There is enough longitudinal play so that the handle may be moved outwardly to disengage bolt 64 but it may hang down in passive position as shown in FIG. 5. Otherwise it is in the way during other operations.

In use, however, the handle is rotated up and engaged on the hex nut, in a position such that the cam rollers strike the bottom of the roller bridge in about the position shown in FIG. 6. The handle might even by placed somewhat higher. Because the roller bridge will have several boxes of melons on it, and because it has a mechanical advantage, it is important that the handle 68 be positionable such that a worker can use his body weight to force up the bridge.

Once in the up position, the rollers hit stops 74 in the over-the-center position so that the bridge will stay up until the next shuttle is in position, at which time the worker reverses the above procedure. Once the bridge is up, the pin at the rear of towbar 76 is pulled to release the towbar, and the filled shuttle truck backs out of the field. Once out, a waiting empty shuttle drives in, is hooked up, and the entire process repeats.

As mentioned in the summary, the time to raise the bridge and release the towbar is only a matter of thirty or forty seconds, representing the only time in which the harvester must be stationary. As soon as the filled shuttle is released and moves out of the field, the harvester starts up again. There is ample room in the sorting bins 34 to permit the machine to operate for several minutes without having to off-load any melons. Also, boxes can be stacked double or triple on the full box conveyor 40 if for some reason it takes an inordinate amount of time for the next shuttle to arrive.

Thus, the system takes the crops as they are growing in the field, and performs all necessary handling, treating, and packaging, and produces a truckload of fruit ready for market. This system is to cantaloupes, other small melons, and other smaller field crops, what the prior systems were to watermelons. As progress in agriculture marches onward, man's dependance on weather and his vulnerability to pestilence is continually reduced, and with the advent of these increasingly sophisticated harvesting machines, dependence on labor and vulnerability to crop loss through inability to harvest fast enough is also greatly reduced, making it more and more possible for our nation's farmers to feed their countrymen as well as other hungry peoples of the world.

While the preferred embodiment of the invention has been described herein, other embodiments may be devised and different uses may be achieved without departing from the spirit and scope of the appended claims.

What is claimed is:

1. An apparatus for harvesting, packing and transporting field crops, comprising:
    (a) a harvesting machine having means to propel same through the fields and also having a collecting system for conveying crops to a packing area on said machine;
    (b) a self-propelled vehicle releasibly linkable to said machine such that said shuttle trails said machine through the fields when linked therewith, said shuttle having a crop preparation area where crops are prepared for shipping;
    (c) a conveyor system for conveying harvested crops from said packing area on said machine to said crop preparation area on said shuttle vehicle, whereby crops can be prepared for shipping on said vehicle and when said vehicle has a full load, it can be released from said machine to transport crops to a freight depot;
    (d) said conveyor system for conveying harvested crops being separable into forward and rear portions carried on the machine and shuttle truck, respectively, said forward portion comprising a powered longitudinal full box conveyor terminating rearwardly in a rearward bridge spanning to said rear portion, said bridge being raisable to separate said forward and rear conveyor system portions; and,
    (e) a roller cam pivoted on an arm and operated by an elongated handle to raise and lower said bridge, said roller cam being rotatable on a shaft and said handle sliding axially on said shaft to selectably engage or disengage same to permit the lowering of said handle into idle position when not in use.

2. Structure according to claim 1 wherein said roller bridge in use angles upwardly to the rear such that full boxes must be forced up said bridge by said full box conveyor.

3. An apparatus for harvesting, packing and transporting field crops, comprising:
    (a) a harvesting machine having means to propel same through the fields and also having a collecting system for conveying crops to a packing area on said machine;
    (b) a self-propelled vehicle releasibly linkable to said machine such that said trails said machine through the fields when linked therewith, said shuttle having a crop preparation area where crops are prepared for shipping;
    (c) a conveyor system for conveying harvested crops from said packing area on said machine to said crop preparation area on said shuttle vehicle, whereby crops can be prepared for shipping on said shuttle vehicle and when said vehicle has a full load, it can be released from said machine to transport crops to freight depot;
    (d) said conveyor system for conveying harvested crops being separable into forward and rear portions carried on the machine and shuttle truck, respectively, the crop preparation area on said shuttle vehicle being a flat bed layered with pallets and said rearward portion comprising a rear roller conveyor sloping down to said flat bed.

4. Structure according to claim 3 wherein said shuttle has a cab on the one side of the front and the rearward portion of said conveyor system comprises a roller conveyor sloping from the front of said shuttle past said cab down to said flat bed.

5. Structure according to claim 4 wherein said shuttle has a cab and said rear roller conveyor has a fixed forward portion adjacent said cab, and the portions to the rear of said forward portion are pivotally mounted thereto and provided in multiple segments, such that the rearmost segment can be sequentially removed as said shuttle truck is filled with boxes stacked on pallets from the rear forward.

6. An apparatus for harvesting, packing and transporting field crops, comprising:
(a) a harvesting machine having means to propel same through the fields and also having a collecting system for conveying crops to a packing area on said machine;
(b) a shuttle vehicle releasibly linkable to said machine such that same move through the fields together when linked, said shuttle having a crop preparation area where crops are prepared for shipping;
(c) a conveyor system for conveying harvested crops from said packing area on said machine to said crop preparation area on said shuttle vehicle, whereby crops can be prepared for shipping on said shuttle vehicle and when said vehicle has a full load, it can be released from said machine to transport crops to a freight depot; and,
(d) said collecting system including a pair of outwardly directed wing conveyors having powered belts thereon and including an upwardly inclined extention trough mounted to the end of each wing conveyor to expand the number of rows harvestable by said machine in one sweep.

7. Structure according to claim 6 wherein said troughs are pivoted to the respective ends of said wing conveyors and fold on top thereof for transport.

8. An apparatus for harvesting, packing and transporting field crops, comprising:
(a) a harvesting machine having means to propel same through the fields and also having a collecting system for conveyng crops to a packing area on said machine;
(b) a shuttle vehicle releasibly linkable to said machine such that said shuttle trails said machine through the fields when linked therewith, said shuttle having a crop preparation area where crops are prepared for shipping;
(c) a conveyor system for conveying harvested crops from said packing area on said machine to said crop preparation area on said shuttle vehicle, whereby crops can be prepared for shipping on said shuttle vehicle and when said vehicle has a full load, it can be released from said machine to transport crops to a freight depot; and,
(d) said conveyor system for conveying harvested crops extended over the rear of said machine and into a generally central portion of the packing area of said shuttle vehicle to deliver full boxes to generally central regions of said packing area.

9. Structure according to claim 8 wherein said conveyor system includes a rear portion carried on said shuttle vehicle, and said rear portion has a forward portion fixed to and slopping downward rearwardly from, the front of said shuttle vehicle, and the portions of said conveyor system to the rear of said forward portion are pivotly mounted thereto and provided in multiply segments, such that the rear most segment can be sequentially removed as such shuttle truck is filled with boxes stacked on pallets from the rear forward.

10. An appraratus for harvesting, packing and transporting field crops, comprising:
(a) a harvesting machine having means to propel same through the fields and also having a collecting system for conveying crops to a packing area on said machine;
(b) a shuttle vehicle releasibly linkable to said machine such that said shuttle trails said machine through the fields when linked therewith, said shuttle having a crop preparation area where crops are prepared for shipping;
(c) a conveyor system for conveying harvested crops from said packing area on said machine to said crop preparation area on said shuttle vehicle, whereby crops can be prepared for shipping on said shuttle vehicle and when said vehicle has a full load, it can be released from said machine to transport crops to a freight depot; and,
(d) said conveyor system for conveying harvested crops being separable into forward and rear portions carried on the machine and shuttle truck, respectively, said forward portion comprising a powered longitudinal full box conveyor terminating rearwardly in a rearward bridge spanning to said rear portion.

11. Structure according to claim 10 wherein said bridge is raisable to separate said forward and rear conveyor system portions.

12. Structure according to claim 11 and including a roller cam pivoted on an arm and operated by an elongated handle to raise and lower said bridge.

* * * * *